United States Patent [19]

Kulak

[11] Patent Number: 4,502,268
[45] Date of Patent: Mar. 5, 1985

[54] APPARATUS FOR CUTTING UPSTANDING AGRICULTURAL CROPS
[75] Inventor: John Kulak, Port Colborne, Canada
[73] Assignee: Deere & Company, Moline, Ill.
[21] Appl. No.: 618,761
[22] Filed: Jun. 11, 1984

Related U.S. Application Data

[63] Continuation of Ser. No. 547,539, Oct. 31, 1983, abandoned.

[51] Int. Cl.$^3$ .............................................. A01D 35/264
[52] U.S. Cl. ........................................ 56/13.6; 56/295; 56/503
[58] Field of Search .................... 56/6, 13.6, 503, 192, 56/295

[56] References Cited

U.S. PATENT DOCUMENTS 2,682,142  6/1954  Clark .
2,753,674  7/1956  Cunningham .
2,815,634  12/1957  Bush .
3,115,741  12/1963  Robinson .
3,400,521  9/1968  Caldwell .
3,469,376  9/1969  Bacon .
4,126,989  11/1978  Oosterling .
4,157,004  6/1979  van der Lely ........................ 56/295
4,235,069  11/1980  Oosterling .
4,302,921  12/1981  Weber .

FOREIGN PATENT DOCUMENTS 2813175  10/1978  Fed. Rep. of Germany ............ 56/6

Primary Examiner—Jay N. Eskovitz
Attorney, Agent, or Firm—David H. Hill; H. V. Harsha

[57]  ABSTRACT

An apparatus for cutting upstanding agricultural crops includes a plurality of adjacent dynamically balanced rotary cutter assemblies each having diametrically opposed blades the outer tips of which are at unequal distances from the rotary axis, corresponding blades on adjacent rotary assemblies being substantially 180° out of phase.

7 Claims, 7 Drawing Figures

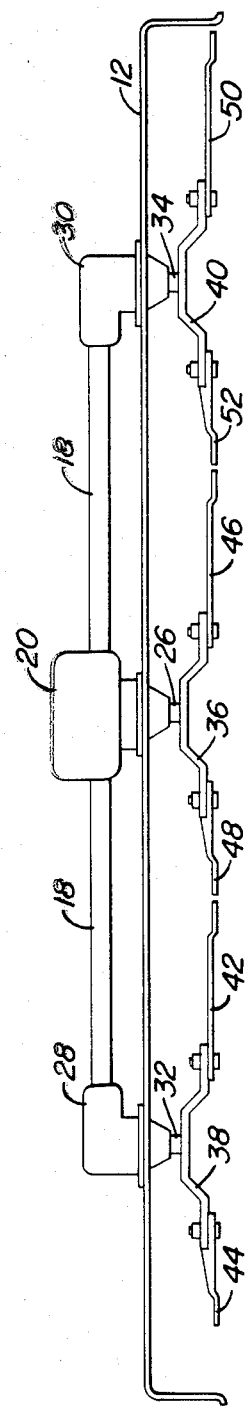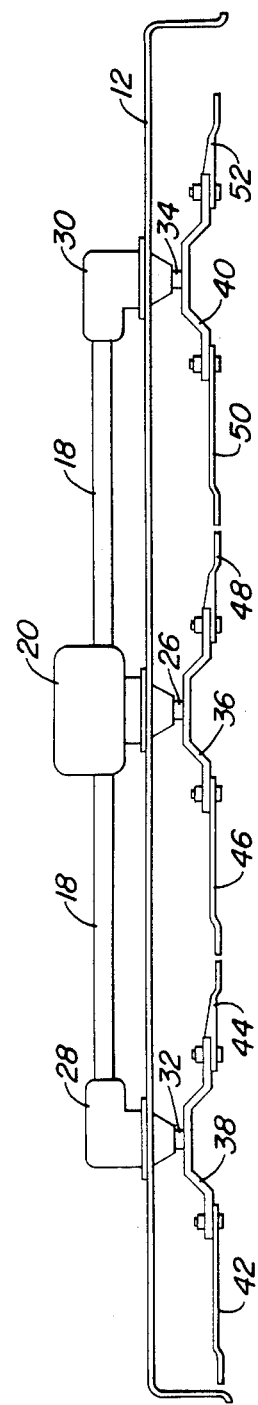

APPARATUS FOR CUTTING UPSTANDING AGRICULTURAL CROPS

This application is a continuation of prior application Ser. No. 547,539, filed Oct. 31, 1983, now abandoned.

BACKGROUND OF THE INVENTION

This invention pertains generally to agricultural apparatus, and more specifically to equipment which is adapted to cut grasses and other upstanding crops by means of a plurality of adjacent rotary cutter elements.

With particular reference to the mowing of grass by means of plural or ganged cutter assemblies, it is usually desired and generally required that the plural cutting means of the machine cut the grass uniformly at a single selected length. When this is accomplished by means of a plurality of side-by-side cutters rotating about adjacent vertical axes, it is a simple enough task to construct or adjust the mower so that the cutting blades are all rotating at the same desired height relative to the ground. A problem exists, however, with respect to ensuring the cutting of the grass between adjacent rotary cutters, since measures must be taken to preclude collisions between adjacent cutters where they are mounted so as to describe overlapping circles of rotation.

One solution to this problem is to mount adjacent rotary cutters in non-overlapping relationship but with the vertical axes of rotation arranged in a line that is askew with respect to the direction of travel of the cutting machine over the field or other area to be cut, so that while the actual circles of rotation described by adjacent rotary cutters do not overlap, the paths cut by such adjacent cutters overlap, to effect a continuous and smooth cutting operation. However, in many applications this structural arrangement is undesirable, it being preferable to arrange the cutters such that the several vertical axes of rotation are in alignment athwart of and substantially perpendicular to the direction of motion of the machinery relative to the ground.

Where a plurality of cutters is mounted as just described, it has become common practice to overlap the cutting circles of adjacent cutters to ensure continuous cutting, but it is then necessary to establish and carefully maintain the relative phasing of the rotation of the several cutters so as to prevent adjacent cutters from striking each other, as would be the case were adjacent cutters to pass through the area of overlap at the same time.

The most common form of rotary cutter constitutes a blade holder in the form of a pair of symmetrically opposed arms extending radially outward from the vertical rotary shaft to which they are attached, with opposed cutting blades being mounted at the outer ends of the respective arms. With adjacent overlapped rotary cutters of this type, it is necessary to phase adjacent rotors such that the cutter blades pass through the area of overlap substantially ninety degrees apart, and it becomes obligatory to maintain this relative rotational relationship rather closely, since such ninety-degree relationship does not allow much margin for error or change before blade interference occurs. From this standpoint, it would be apparent that the ideal rotary drive system would be quite rigid, permitting little play, slack or backlash. However, other conflicting realities of the mowing art call for a rotary drive system with at least some of the elements thereof being capable of yielding at times.

Where the rotary drive system between the power source and the several rotary cutters is substantially rigid or non-yielding, considerable damage can occur in the gear boxes, the drive shafts or in the cutter assemblies themselves, when a cutter "scalps" the ground on uneven terrain or strikes a hard object lying on the ground. Since accidents of this type occur with some frequency and are difficult to avoid during a mowing operation, the machines of the prior art have in some instances been provided with rotary drive shafts capable of yielding to unexpected forces. More specifically, some machines have flexible rotary drive shafts extending between adjacent ones of a series of in-line gear boxes, whereby temporary stoppage of a rotary blade can result in "wind-up" or torsional twisting of a flexible drive shaft, preventing structural damage to the parts as a result of the stoppage, but at the expense of a positional error or rotational misalignment of up to sixty degrees over the length of the flexible shaft. Clearly, the aforementioned ninety-degree relationship between blades of adjacent cutters passing through an area of overlap cannot tolerate the resultant misalignment of the rotors, since the blades on such adjacent rotors will collide, with resultant damage to the blades and perhaps to the drive mechanism.

SUMMARY OF THE INVENTION

In accordance with the present invention, the aforementioned problem is avoided by the utilization of asymmetrically constructed but dynamically balanced rotary cutters, in combination with a yielding type of drive shaft means. More particularly, a mower apparatus in accordance with the present invention utilizes adjacent rotary cutter means each having a first cutting blade the outer tip of which is at a materially greater radius than the outer tip of a second cutting blade thereon, the adjacent vertical rotary shafts for such cutters being relatively spaced such that the circles of rotation described by the outer tip of each such first cutter blade overlaps the circle of rotation described by the outer tip of such first blade mounted on each such adjacent shaft while not overlapping the circle of rotation described by the outer tip of such second blade on such adjacent shaft. Torsionally flexible or yielding driving shaft means interconnect the several vertical rotary cutter shafts and a suitable rotary power source on the mower machine or on a towing vehicle, and the relative rotational positions of adjacent ones of such vertical shafts are such that, with no flexing of the driving shafts, the first blades on adjacent ones of the shafts pass through the area of overlap substantially 180 degrees out of phase.

BRIEF DESCRIPTION OF THE DRAWINGS

FIG. 3 is a schematic elevation view of the rotary cutters of the present invention in a first position, FIG. 4 is a schematic elevation view similar to FIG. 3 but showing the rotary cutting elements in a phase 180 degrees removed from the showing of FIG. 3.

DESCRIPTION OF A PREFERRED EMBODIMENT

Figure 1:
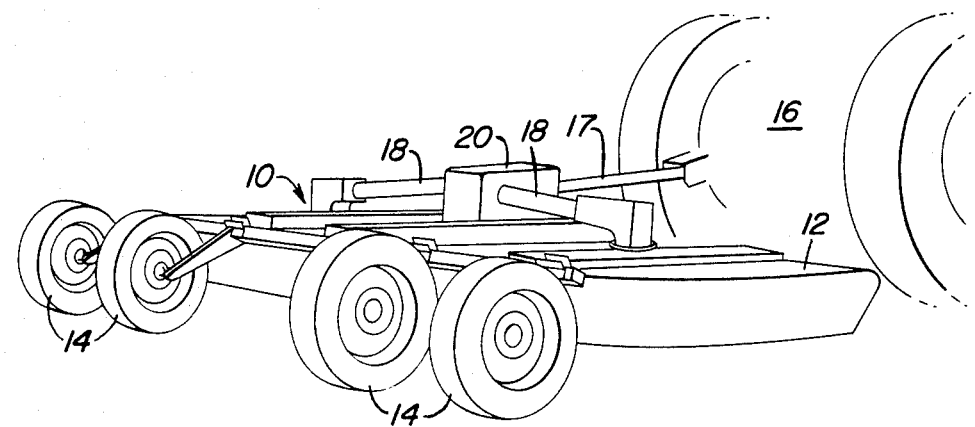
FIG. 1 is a perspective view of the overall assembly of the present invention.

Referring now to FIG. 1, the rotary cutting apparatus of the present invention is shown generally at 10, comprising a suitable housing 12 or the like to which are connected a plurality of supporting wheels 14, the wheels preferably being adjustable as is well known in the art in order to regulate the cutting height. A tractor 16 is utilized to both support the front end of the apparatus 10 and to draw the same across a field containing the crop to be cut; the usual three-point hitch may be employed, with rotary motion being supplied by means of rotary shaft 17, the rotary motion of which is converted to rotary motion of the horizontal rotary driving shaft means 18, the conversion of rotation taking place within gear housing 20.

Figure 2:
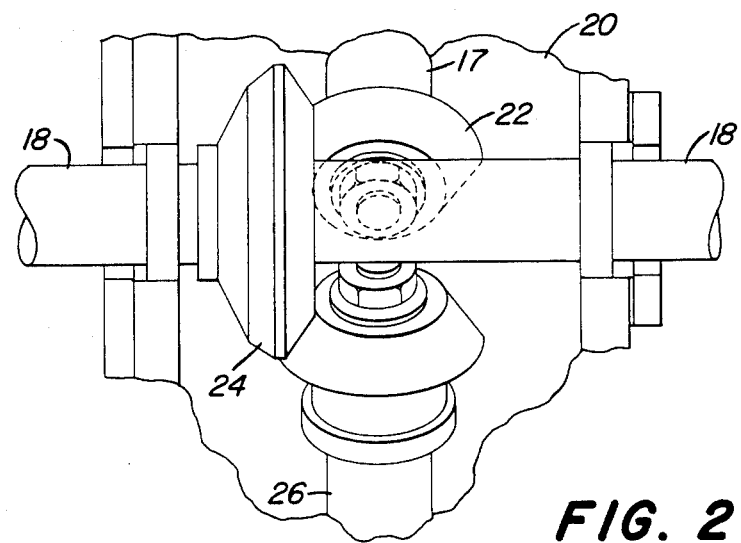
FIG. 2 is a perspective view, with portions broken away for clarity, of a gearbox utilized in the present invention.

FIG. 2 shows in some detail the gearbox 20 and the means of transferring the longitudinal axial rotation of shaft 17 into lateral axial rotation of the driving shaft means 18, the input to the gearbox from shaft 17 being transferred by means of bevel gear 22 to a cooperating bevel gear 24 which is mounted on driving shaft means 18. This rotary motion is also transferred to a vertical cutter shaft 26, the bottom end of which is connected to one of the three rotary cutter assemblies shown in connection with the description of the preferred embodiment of the present invention. As may be seen in FIG. 2, suitable bearings are provided for journalling the several shafts relative to the gearbox 20.

In the schematic elevation view of FIG. 3, the gearbox 20 is shown above rotary shaft 26, with driving shaft means 18 extending from both sides of the gearbox 20. The drive shaft means 18 terminates at respective ends thereof in additional gearboxes 28 and 30, each including cooperating bevel gears of the type shown in FIG. 2 in connection with the description of gearbox 20. The motion is converted from horizontal rotary motion to rotation of vertical shafts 32 and 34 as may be seen in FIG. 3.

Each of the vertical rotary shafts 26, 32 and 34 has, respectively, a symmetrical mounting means 36, 38 and 40 fixedly secured thereto for rotation with each respective shaft. The two arms of each of the blade-mounting means 36, 38 and 40 are symmetrical and of equal radial length. However, blade 42 on mounting means 38 is materially longer radially than opposed blade 44 thereon. Similarly, a first blade 46 on mounting means 36 is materially longer radially than a second blade 48 thereon, as is a first blade 50 mounted on mounting means 40, being longer than second blade 52 attached thereto. It will be appreciated that the outer tip of each of said first blades 42, 46 and 50 will describe a circle of rotation of materially greater diameter than the circles of rotation described by second blades 44, 48 and 52. However, each of these asymmetric rotor assemblies is dynamically balanced, such as by having the second blades 44, 48 and 52 be made from heavier stock material, or the rotors may be otherwised balanced as may be visualized by anyone skilled in the art.

Figure 5:
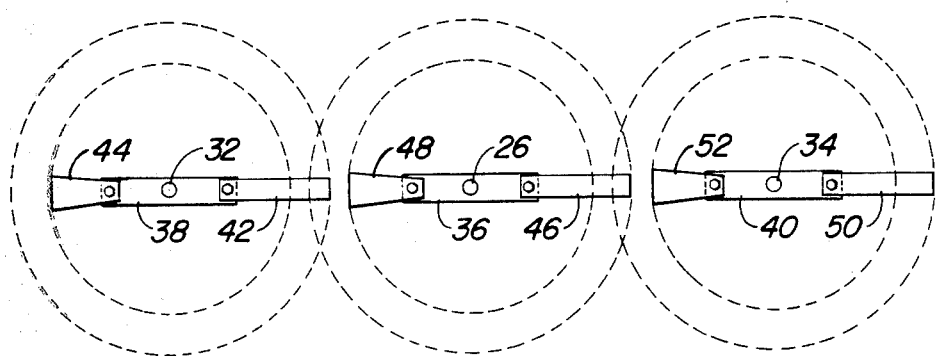
FIG. 5 is a schematic representation of the circles of rotation described by a trio of rotary cutting members in accordance with the present invention.

FIG. 5 shows the respective circles of rotation of these several elements. More particularly, it may be seen in FIG. 5 that the circles of rotation described by the outer tip of cutting blade 42 on shaft 32 is of a diameter materially greater than the circle of rotation described by the outer tip of cutter element or blade 44 thereon. Similarly, the circles of rotation of the outer tips of blades 46 and 50 are of a diameter materially greater than the circles of rotation described by the outer tips of shorter cutting blades 48 and 52. Each of these respective circles of rotation may be seen in FIG. 5, wherein it will be observed that the circle of rotation described by the outer tip of cutting blade 42 overlaps the circle of rotation described by the outer tip of blade 46, while not overlapping the circle of rotation described by the outer tip of blade 48. In short, the shafts 26 and 32 are spaced apart a distance to permit overlap of the two greater circles of rotation, while not overlapping either of the smaller circles of rotation. Similarly, shaft 34 is positioned relative to shaft 26 so as to, again, effect an overlap between the larger circles of rotation associated with these two shafts, while not permitting an overlap of the smaller circles of rotation associated therewith.

FIG. 4 is a schematic elevation substantially identical to that of FIG. 3, but with each of the rotary cutter element assemblies shifted in position through 180 degrees relative to the showing of FIG. 3. It will be appreciated by those skilled in the art upon comparison of FIG. 3 and FIG. 4, in association with the showing of FIG. 5, that the asymmetric relationship between the several cutter assemblies achieves a smooth and continuous cutting of grass or other upstanding crop in a field traversed by the apparatus of the present invention, and that the transverse in-line relationship of the rotary assemblies minimizes the throwing of cut crop by each into the path cut by the others, affording even distribution of the cut materials. Also, while the actual rotary structures are asymmetric, each of the rotor structures having a first cutting blade extending outwardly to a radius materially greater than that of the second cutting blade thereon, each of the rotors is dynamically balanced, as by forming the shorter cutting blade or the supporting arm associated therewith of heavier material than the first or longer cutting blade or its supporting arm.

Figure 6:
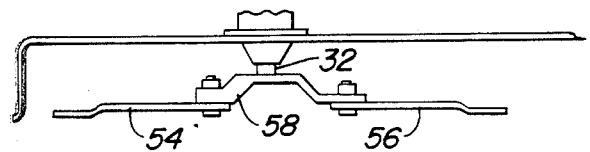
FIG. 6 is a partial schematic view similar to FIG. 5, showing a modified form of the apparatus of the present invention.

Alternatively, and as is shown schematically in FIG. 6, a pair of identical cutting blades 54 and 56 may be mounted on an asymmetric support means 58, the radial distance from the center of shaft 32 to the outer tip of blade 56 being greater than the radial distance from the center line of shaft 32 to the outer tip of blade 54. This is accomplished in spite of the symmetry of blades 54 and 56 by means of an asymmetric mounting arm or member 58, the right-hand portion of which (in FIG. 6) is longer than the corresponding left-hand portion thereof, the thickness of the shorter arm being greater than that of the longer arm, so that the rotor assembly is maintained in a state of dynamic balance. Obviously, this dynamic balance could equally well by achieved by means of a thinner left-hand portion which extends outwardly past the point at which the blade 54 is attached.

Figure 7:
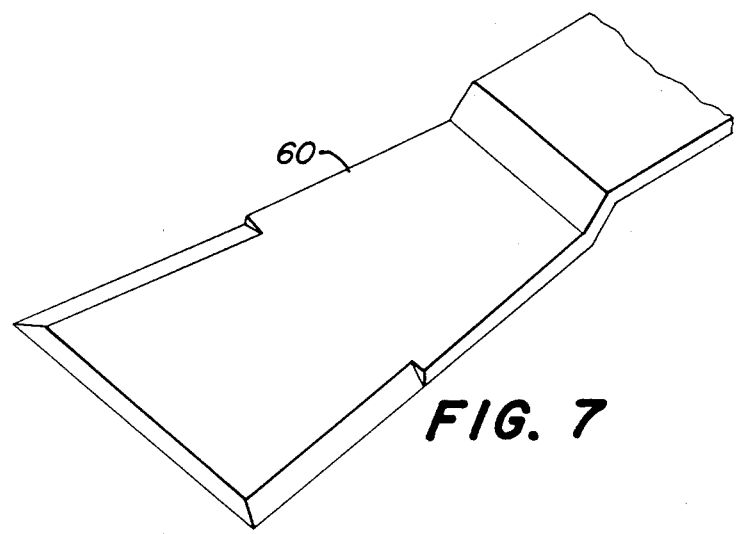
FIG. 7 is a detail view of an alternate configuration of one of the cutting elements of the present invention.

As a further alternative, the shorter blade 60 of any of the rotor assemblies may have a wedge-shaped configuration as shown in FIG. 7, thus adding to the mass of the shorter arm of a given assembly. As is readily apparent, one advantage afforded by the use of wedge-shaped blade 60 is that should it tend to swing back on its pivot bolt, relative to the support arm, the angled cutting blade will then tend toward the more optimum radial position.

The invention has been described above in some detail, and particularly with respect to the description of a preferred embodiment as described herein. It will be appreciated by those skilled in the art that any number of laterally-spaced overlapping rotary cutter assemblies may be utilized, depending upon the practical limitations imposed in the actual manufacture and use of such equipment; hence, the invention is not limited to the use of three such overlapping rotor assemblies as shown and described herein. Further, while the apparatus may serve perfectly well in cutting grass or for use in other domestic types of service, the apparatus of the invention may well be used for cutting crops in the field, whether crops growing at the time or the stubble left from a harvesting, such stubble being cut and used as forage materials. Hence, the invention should not be considered as limited to the details given in connection with the description of the preferred embodiment, but only insofar as delimited by the appended claims.

What is claimed is:

1. An apparatus for cutting grass and other upstanding agricultural crops with a plurality of adjacent rotary cutter elements, comprising:

horizontal rotary driving shaft means axially athwart the direction of movement of such apparatus across a field to be cut, plural means engaged by said driving shaft means to convert the motion of rotation thereof to rotary motion about a vertical axis in a respective vertical shaft engaged thereby at each of said plural means, means attached to each said vertical shaft for mounting thereon a pair of diametrically opposed cutting blades, the radial dimensions of said mounting means and of said cutting blades being such that the outer tip of the first of the two opposed cutting blades is at a materially greater distance from the center of said vertical shaft than the outer tip of the second said blade, said mounting means and said blades constituting substantially equal masses on the opposed sides of said shaft so as to form a dynamically balanced rotor on said shaft, and means for mounting adjacent ones of said vertical shafts such that the circle of rotation described by the outer tip of each said first blade overlaps the circle of rotation described by the outer tip of said first blade mounted on each adjacent said shaft while not overlapping the circle of rotation described by the outer tip of said second blade mounted on said adjacent shaft, the relative rotational positions of adjacent ones of said vertical shafts being such that said first blades on adjacent ones of said shafts pass through the area of such overlap substantially 180 degrees out of phase.

2. An apparatus for cutting grass and the like in accordance with claim 1, wherein said horizontal rotary driving shaft means is resilient, whereby a temporary cessation of motion of said cutting blades results in a torsional flexing of said horizontal rotary driving shaft means with uninterrupted rotary motion thereof.

3. An apparatus for cutting grass and the like in accordance with claim 1, wherein said mounting means on each said vertical shaft constitutes a pair of substantially identical opposed arms, and said first cutting blade thereof is radially longer than said second cutting blade thereon.

4. An apparatus for cutting grass and the like in accordance with claim 3, wherein said second cutting blade is of a greater mass than said first cutting blade.

5. An apparatus for cutting grass and the like in accordance with claim 3, wherein said second cutting blade has a wedge-shaped vertical cross-section.

6. An apparatus for cutting grass and the like in accordance with claim 1, wherein said first and second cutting blades on each said mounting means are substantially identical, but the mounting means therefor is asymmetric with respect to the axis of the vertical shaft on which it is mounted.

7. An apparatus for cutting grass and the like in accordance with claim 6, wherein the shorter arm of said asymmetric mounting means is of substantially the same mass as the longer arm thereof.

* * * * *